June 5, 1956
J. S. STODARD
2,748,681
ALTERNATE CONTROL FOR PLURAL LATERAL AND
REAR CULTIVATOR ATTACHMENTS
Filed Dec. 8, 1950
3 Sheets-Sheet 1
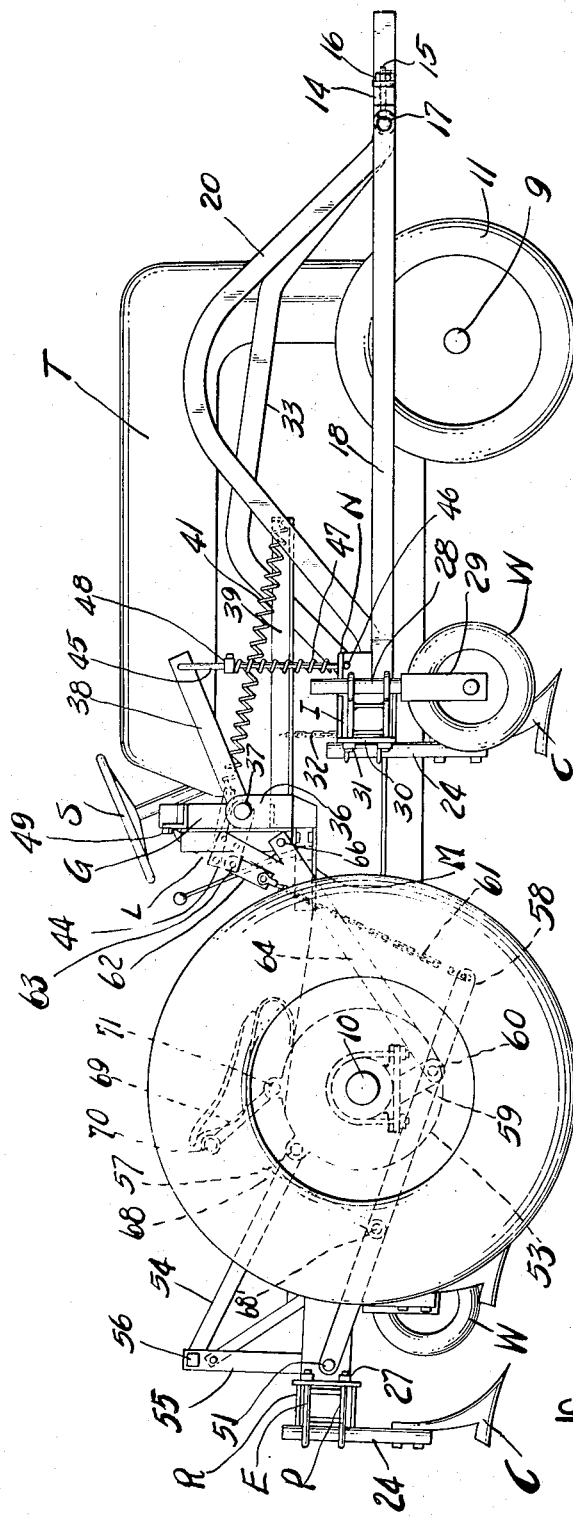
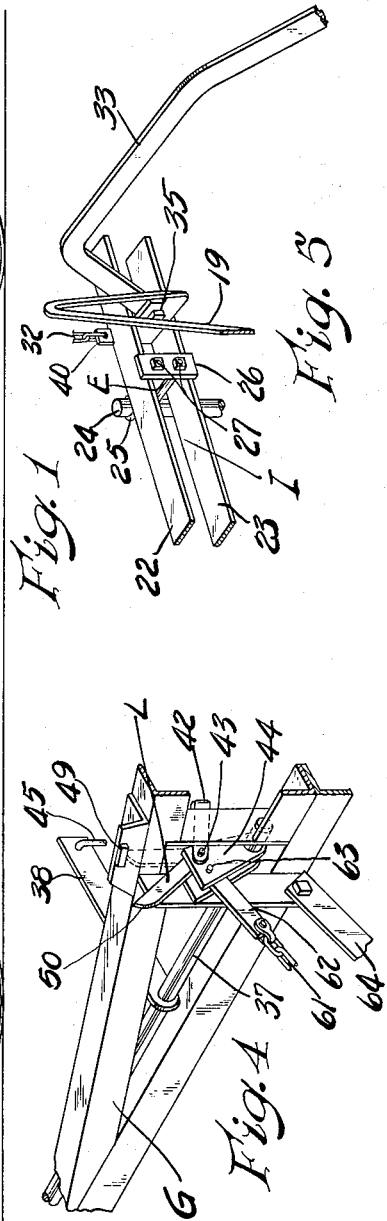
INVENTOR.
Joseph S. Stodard.
BY
Frank C. Leanman
ATTORNEY

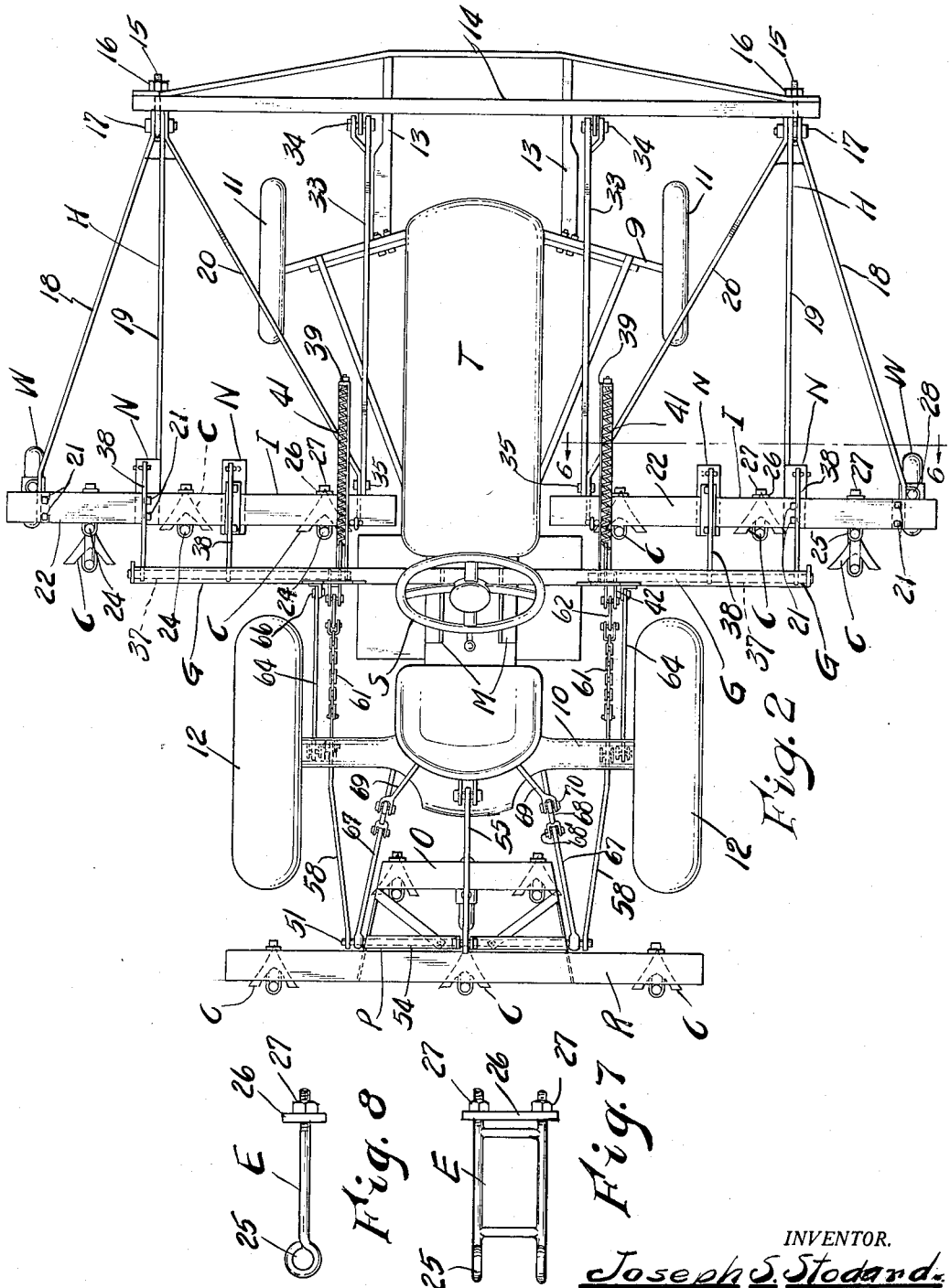

June 5, 1956
J. S. STODARD
2,748,681
ALTERNATE CONTROL FOR PLURAL LATERAL AND
REAR CULTIVATOR ATTACHMENTS
Filed Dec. 8, 1950
3 Sheets-Sheet 3
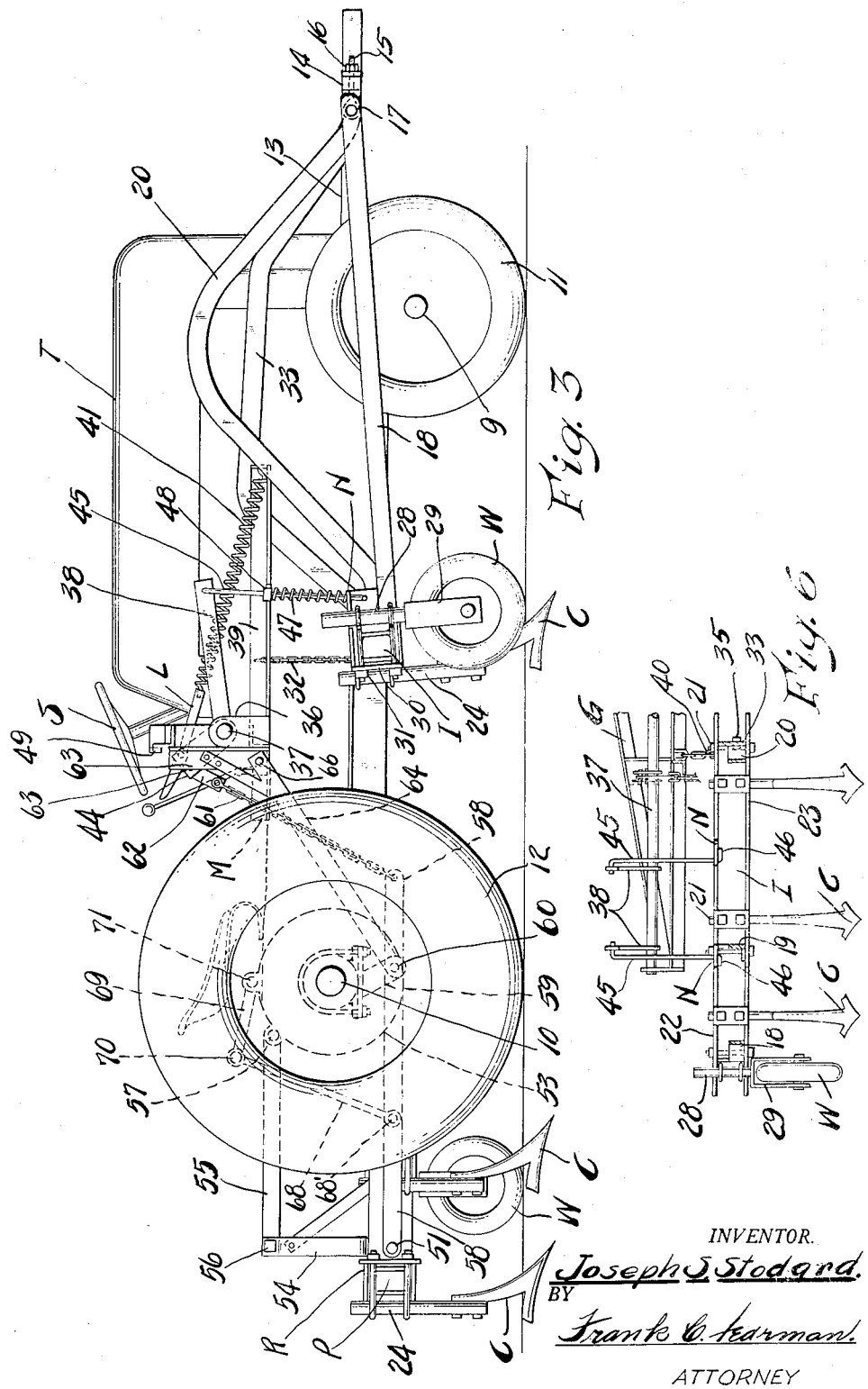
INVENTOR.
Joseph S. Stodard
BY
Frank C. Fearman
ATTORNEY

United States Patent Office 2,748,681
Patented June 5, 1956

2,748,681

ALTERNATE CONTROL FOR PLURAL LATERAL AND REAR CULTIVATOR ATTACHMENTS

Joseph S. Stodard, Port Austin, Mich.

Application December 8, 1950, Serial No. 199,790

3 Claims. (Cl. 97—46.45)

The present invention relates to cultivator attachments for tractors for cultivating a plurality of rows of plants simultaneously.

One of the prime objects of the invention is to combine with a tractor, a cultivator tooth multiple row attachment, universally attached to the front axle frame of the tractor so that each cultivator unit will be pivotally and flexibly connected, to the end that any change of direction or turning movement of the tractor proper will be simultaneously communicated to the attachment, enabling the tractor and the cultivator units to closely follow the deviations of the plant rows, furrows, or other ground irregularities without destruction of plants of the individual rows, or otherwise interfering with the operation of the mechanism.

Another object is to design a cultivator attachment which can be easily and quickly attached to and/or detached from the tractor, which is extremely easy to adjust, and which closely follows the rows of plants, insuring thorough cultivation of the ground between the rows of plants being cultivated.

A further object is to design a cultivator attachment of simple, practical construction, which is closely and compactly coupled to the tractor, which does not obstruct the driver's vision of the plant rows, and which requires a minimum of power to operate.

Still a further object is to provide an attachment including a transversely disposed beam to which the cultivator units are pivotally connected, and provide means for vertically adjusting the cultivator units to operative or inoperative position.

A further object still is to design an attachment so designed and connected that any turning movement of the tractor is immediately communicated to the cultivator units to the end that the cultivator units closely follow all curves and deviations from a straight line.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view of a conventional tractor with my cultivator attachments in place thereon and in raised position.

Fig. 2 is a top plan view thereof.

Fig. 3 is a view similar to Fig. 1 showing the cultivator units lowered and in position for cultivating.

Fig. 4 is a fragmentary, isometric view illustrating the frame connection.

Fig. 5 is a fragmentary, perspective view of the implement bar and bowed drag link.

Fig. 6 is a fragmentary, front elevational view of the implement bar and supporting mechanism taken on the line 6—6 of Fig. 2.

Fig. 7 is an enlarged, side elevational view of the cultivator tooth eye bolt assembly.

Fig. 8 is a plan view thereof.

Referring now more specifically to the drawings in which I have shown the preferred embodiment of my invention, the letter T indicates the conventional tractor equipped with front and rear axles 9 and 10 on which wheels 11 and 12 are mounted as usual, and a conventional steering wheel S forms a part of the tractor.

Forwardly projecting braces 13 are connected to the front axle frame of the tractor, and a transversely disposed attaching bar 14 is connected to the braces 13 in any desired manner.

Individual triangular-shaped draft units H are pivotally connected to the bar 14 on the opposite sides of the tractor to swing in vertical planes, these units comprising bars welded or otherwise rigidly connected together at their front ends and an eyebolt 15 extends forwardly into said bar 14 and is held in place by means of a nut 16 as usual, the eye of said bolt being pivotally connected to the end of the unit H by means of the bolt 17, the rear ends of the bars 18, 19 and 20 which make up each assembly being secured to an implement beam I by means of bolts 21 or the like.

This implement beam I is formed as clearly shown in Figures 2 and 5 of the drawings and comprises horizontally disposed, vertically spaced beam sections 22 and 23, the ends of the members 18, 19 and 20 being interposed therebetween and being held in position by means of bolts 21, these end sections holding the beam sections in vertically spaced relation.

Cultivator teeth C are mounted on the beam I (see Fig. 7), the shanks 24 being adjustably mounted in the eyes 25 of the eyebolt assemblies E, these eyebolts being connected together in spaced relation, with the threaded ends of the bolts extending through the bar connectors 26 which span the beam sections 22 and 23 and are secured thereto by means of nuts 27 as usual.

The outer end of each implement beam I is supported on a wheel W, the wheel assembly including a shank 28 terminating in a fork 29 in which the wheel is mounted, said shank being secured by means of eyebolt assemblies F formed the same as the assembly E, excepting that they are disposed in the opposite direction, the threaded ends of each assembly extending through the bar connectors 30 and being secured by means of nuts 31 as usual, the inner end of each implement bar being suspended by chains 32, or it can be supported by a wheel if desired.

One end of a drag link 33 is connected to the bar 14 by means of the bolt 34, the opposite end being connected to the bar 20 by means of the bolt 35, said drag link being upwardly arched to eliminate interference with the front axle frame and the steering mechanism of the tractor.

It will be noted that the bar 20 of each triangular-shaped unit H is arched as illustrated in Figs. 1 and 3 of the drawings to permit the front wheels of the tractor to be freely turned without interfernce, the rear end of said bar being connected to the implement beam I by means of bolts 21 (see Fig. 6 of the drawings), the bolt opening through the drag link being large enough to provide for a loose connection at this point, or a large sleeeve (not shown) may be inserted in the drag link and through which the bolt extends to provide flexibility.

Transversely disposed, fabricaed beam assemblies G are secured to the tractor frame directly in the rear of the steering wheel S by means of brackets bolted to tractor gear housing M, and to which the assemblies G are connected, each assembly including vertically disposed bearings 36 which a shaft 37 is journaled.

Forwardly projecting legs 38 are provided on each shaft 37, and spaced-apart, forwardly-projecting arms 39 are mounted on the frame G, a chain 32 being suspended from each arm with its lower end connected to the inner end of the implement beam I at the point 40 and in any approved manner. A spring 41 is connected to the outer end of each arm 39 in any approved manner, the opposite end being connected to a clevis 42 which is pivotally connected at 43 to a pair of spaced-apart, upwardly projecting plates 44 rigidly provided on the shaft 37, thus adding weight to the tool bar if necessary.

Depending rods 45 are pivotally connected to the ends of the arms 38, with the lower end of each rod extending through a suitable opening in the projecting plate N which is mounted on the upper section 22 of the implement beam I, the end of the rod being turned at right angles to the main body as at 46 to form a loose sliding connection with the implement beam, and a spring 47 is interposed between the top of the implement beam and a collar 48 provided on the rod 45.

This rod and spring arrangement yieldingly forces the implements C into the ground, and also permits upward movement of the implement beam when the spring is compressed, due to traveling over raised surfaces, contact with solid obstacles etc.

The outer end of each implement beam I is supported by the wheel W and the inner end can be suspended as above described, or another wheel can be used on this end if desired.

A rearwardly projecting lock plate 49 is provided on the assembly G (see Fig. 4 of the drawings), and a latch member L is mounted on the pin 43 betwen the plates 44, the upper end 50 of said latch engaging the lock plate 49 and holding the implement bars in raised position, and as indicated in Fig. 1 of the drawing.

A rear cultivator unit P is mounted directly in the rear of the tractor rear wheels, and includes horizontally spaced bars R and O to which cultivator implements C are connected in exactly the same manner as are the front cultivator implements mounted on the implement beam I.

A split draw pin 51 is provided on the rear bar R as shown, and lifting arms 67 are rigidly connected to said pin and to the hydraulic lift, indicated generally at 53, on the tractor (see Fig. 3 of the drawings).

An upstanding yoke member 55 is mounted on the split draw pin 51 and connects both ends thereof to a stabilizer bar 54 which is pivotally connected to said yoke by the pin 56, the opposite end of the bar being connected to the lift mechanism (not shown) by means of pin 57.

Main lifting bars 58 are rigidly connected to the draw pin 51 and to a tractor carried bracket 59 by means of a pin 60, the forward ends of said bars being connected to chains 61 which are in turn secured to links 62, said links being pivotally connected to the plates 44, which are mounted on the shaft 37, by means of the pins 63.

Braces 64 are connected to pin 60 provided on the bracket 59 and to the beam G by means of bolts 66, these braces serving to firmly secure the beam G in position. Hydraulic lift bars 67 are pivotally connected to the draw pin 51 and to the tractor hydraulic lift mechanism (not shown) and lift links 68 are connected to the bars 67 by means of pins 68', the upper ends being connected to the arms 69 by the pins 70, said arms being mounted on the shaft 71 which is actuated by the hydraulic lift mechanism (not shown).

The hydraulic lift and connecting mechanism is of conventional design, and I do not deem it necessary to show or described it in detail, as it forms no part of the present invention.

The cultivator units are raised simultaneously by actuating the hydraulic system through a control system (not shown) to rock the pin 57 which pivots the bar 55 to raise the rear unit P and the front implement beams I. The lift bars 58 connect to the ends of the pin 51, and to the plates 44 by means of the chains 61 and links 62, and as the shafts 37 are rocked, the arms 38 operate to raise the implement bars I. While the cultivator units P and I—I are raised simultaneously, the units I—I can be lowered independently of each other if desired, it is merely necessary to latch the upper end 50 of member L into enagement with the lock plate 49 which will hold the one cultivator raised, while the latch member L on the opposite side of the tractor can be unlatched to lower the unit on that side.

I wish to direct particular attention to the fact that the cultivator units are flexibly connected for universal movement so that they readily follow all irregularities in the ground and/or deviations between rows of plants being cultivated. The units are closely coupled so that any turning movement of the tractor is immediately communicated to the cultivator units, and I also wish to point out that the bar 20 and drag link 33 are upwardly bowed to provide necessary clearance to permit unobstructed turning movement of the tractor front wheels, and also eliminate interference with the steering mechanism and frame section.

The wheels W, chains 32 and rod assemblies 45 control the depth of cultivation etc., and the shaft 37 is of course formed in two sections, one at each side of the tractor so that each cultivator unit can be independently lowered as desired.

The front universal connection of the cultivator units to the beam 14 and the loose connection of the rear end of the bar member 20 to the drag link 33 also permits flexibility of movement of each of the cultivator units so that they readily follow variations in the ground, direction of travel and turning movement.

From the foregoing description, it will be obvious that I have perfected a very simple, practical and substantial flexible cultivator attachment for tractors for cultivating food crops of all kinds.

What I claim is:

1. In combination, a tractor, a transversely disposed attaching bar supported adjacent the front end thereof, separate draft units pivotally connected to said attaching bar to selectively swing in a longitudinal plane extending rearwardly along the sides of said tractor, a transversely disposed side implement beam mounted on each draft unit, cultivator implements depending from said side beams engagable with the ground when said draft units and side beams are permitted to swing downwardly, transversely disposed support means rearwardly of and above said side beams, a pair of transversely disposed, axially aligned shafts rotatably supported thereon, said support means including upper beams a spaced distance above said shafts, an arm rigid on each shaft extending forwardly from each shaft, rod means connecting each arm to one of said side beams, a plate member rigid on each of said shafts extending rearwardly therefrom, lateral projections on said upper beams above said plate members, a transversely disposed, rear implement beam spanning the rear end of said tractor pivotally supported thereon to swing in a longitudinal plane, cultivator implements depending from said rear beam engagable with the ground when said rear implement beam is swung downwardly, forwardly extending levers connected to said rear implement beam pivotally sutpported interadjacent their ends on said tractor, flexible connectors connecting the front ends of said levers and said plate members, means for raising said rear implement beam and pivoting the levers connected thereto to pivot said shafts and raise said side beams simultaneously, and independent latch bars pivotally mounted on both of said plate members and swingable upwardly to bear on the rear face of said upper beams and engage under said lateral projections to prevent rotation of one or both of said shafts and maintain one or both of the side beams in raised position when the rear implement beam is swung downwardly to ground-engaging position.

2. The combination defined in claim 1 in which the attaching bar is supported on the front of said tractor and each of said draft units is pivoted to one end thereof, each draft unit comprising a plurality of rearwardly diverging bar members rigidly connected together at their front ends with their rear ends connected to the side beams, and a drag link unit is provided inwardly of each draft unit with one end pivotally connected to the attaching bar and the opposite end loosely connected to a side beam, the drag link and adjacent bar of each unit being upwardly bowed to provide clearance for the tractor wheels.

3. The combination defined in claim 1 in which springs under tension connected between said plate members on the shafts and the tractor forwardly of the said plate members tend to urge said plates to swing forwardly and said shafts to rotate in a direction whereby said side beams are lowered.

References Cited in the file of this patent

UNITED STATES PATENTS

| Number | Name | Date |
|---|---|---|
| 313,019 | Parker | Feb. 24, 1885 |
| 1,381,984 | Gapp | June 21, 1921 |
| 1,541,955 | Hollenbeck | June 16, 1925 |
| 1,789,563 | Quinan | Jan. 20, 1931 |
| 1,797,231 | Herron | Mar. 24, 1931 |
| 1,827,708 | Brown | Oct. 13, 1931 |
| 1,832,946 | Robinson | Nov. 24, 1931 |
| 1,854,231 | Silver | Apr. 19, 1932 |
| 1,922,222 | Strandlund et al. | Aug. 15, 1933 |
| 1,960,268 | Kriegbaum et al. | May 29, 1934 |
| 2,156,569 | Lindgren et al. | May 2, 1939 |
| 2,172,983 | Morkoski | Sept. 12, 1939 |
| 2,259,890 | Hipple | Oct. 21, 1941 |
| 2,332,616 | Tuft | Oct. 26, 1943 |
| 2,354,084 | Geraldson | July 18, 1944 |
| 2,390,767 | Alderman | Dec. 11, 1945 |
| 2,425,806 | Ing | Aug. 19, 1947 |
| 2,558,123 | Brown et al. | June 26, 1951 |

FOREIGN PATENTS

| Number | Country | Date |
|---|---|---|
| 643,213 | Great Britain | Sept. 15, 1950 |